Dec. 6, 1949  G. MAXON, JR  2,490,532
DUMP TRUCK

Filed Feb. 9, 1944  6 Sheets-Sheet 1

Fig.1

Inventor
Glenway Maxon Jr.

Dec. 6, 1949 G. MAXON, JR 2,490,532
DUMP TRUCK
Filed Feb. 9, 1944 6 Sheets-Sheet 4

Fig. 4

Inventor
Glanway Maxon Jr
By J. Shilton Jones
Attorney

Dec. 6, 1949  G. MAXON, JR  2,490,532
DUMP TRUCK
Filed Feb. 9, 1944  6 Sheets-Sheet 6

Patented Dec. 6, 1949

2,490,532

UNITED STATES PATENT OFFICE 2,490,532

DUMP TRUCK

Glenway Maxon, Jr., Milwaukee, Wis.

Application February 9, 1944, Serial No. 521,670

11 Claims. (Cl. 298—22)

This invention relates to dump trucks of the rear end discharging type. Its general object is the provision of a truck of this character capable of carrying and handling extremely heavy loads. This adapts the truck especially well for use in open pit mines and large construction projects involving the excavation and hauling of great quantities of earth, large stones and boulders.

One of the specific objects of the invention is to provide a dump body and tilting mechanism therefor so designed that while adapted for application to a commercially available truck chassis no sub-frame is required, thereby materially lowering the center of gravity.

In a broad sense the tilting mechanism operates upon the same principle as employed in the dump body operating mechanism forming the subject matter of Patent No. 1,904,922, issued to T. G. Jungersen, April 18, 1933. The characteristic feature of this mechanism is a novel system of levers and linkage through which a hydraulic motor acts to raise and lower the body. The levers, which may be broadly considered bell cranks, are provided with rollers that ride on horizontal tracks. One arm of each of these bell crank levers is linked to the body and the other to a pivot fixed with respect to the chassis. Movement of the bell crank levers along the tracks thus causes the levers to rock and impart the desired tilting motion to the body.

In the aforesaid patent no effort is made to adapt the tilting mechanism to any particular truck chassis. The present invention, however, contemplates adaptation of the body and tilting mechanism to a truck chassis in a manner obviating the heretofore necessary sub-frame. Hence, it is an object of this invention to so arrange the levers and linkage that the bell crank levers virtually wrap themselves around or rock over the adjacent cross member of the truck chassis as the body is raised and lowered. This enables reduction of the height of the space needed for the operating mechanism to the extent of eliminating the need for a sub-frame and allowing the mechanism to be mounted directly on the chassis.

Another object of this invention is to provide operating mechanism for tilting the body of a dump truck wherein the same means, in this case a hydraulic motor, which raises the body also pulls the same back from its fully raised position to the point where gravity can be relied upon to restore the body to its lowered load carrying position.

When the body is raised to a steep discharging angle the action of the load as it leaves the body has a tendency to further tip the body beyond its raised position causing the rollers on the bell crank levers to leave the tracks, and when force is applied to lower the body the same condition obtains.

It is, therefore, a further object of this invention to provide guard rails or auxiliary track means overlying the horizontal tracks and the rollers thereon to prevent the rollers being lifted off the tracks.

Another object of this invention is to preclude the application of unequal lifting forces on the opposite sides of the body, which occurs in trucks equipped with separate hydraulic cylinders to lift the opposite sides of the body whenever the body is lifted while the truck is parked on a sidewise inclination, notwithstanding that the present invention likewise employs hydraulic cylinders at opposite sides of the vertical median plane of the truck.

In dump trucks of this type, the body may be secured in its lowered load transporting position in many different ways. Latches may be employed or the hydraulic system itself may be used to hold the body down. The present invention employs the latter of these methods, but in this respect has the additional purpose of providing a more or less yieldable or cushioned seat for the front end of the body, the resiliency of which acts against the fluid pressure in the hydraulic system to thereby floatingly hold the front end of the body in its lowered position.

A still further object of this invention is to provide a body sufficiently strong to allow extremely heavy rocks and boulders being dropped into the body and to provide a novel arrangement of ribs and keels by which the required body strength is achieved.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 7 is a detail sectional view to show the manner in which the bell crank levers are secured together in fixed relation and the way in which the rollers are mounted.

Referring now particularly to the accompanying drawings, in which like numerals indicate like parts, the numeral 5 designates generally the body of the truck which is tiltably mounted upon the chassis indicated generally by the numeral 6.

The chassis, as is customary, includes two longitudinal sills 7 connected by the transverse members 8 and a box-like cross beam 9 resting on and connecting the sills directly behind the cab 10 of the truck.

Mounted on the rear end portions of each longitudinal sill is a casting 11. These castings have axially aligned bearings 12 to receive a cross shaft 12' by which the body is tiltably or hingedly mounted on the chassis. Forwardly of the bearings 12 the castings have horizontal tracks 13 which constitute part of the mechanism for raising and lowering the body.

A lever structure indicated generally by the numeral 14 cooperates with the tracks. This lever structure consists of two identical transversely spaced bell crank levers 15 keyed or otherwise fixed to a cross shaft 16. A tube 16' surrounds the shaft between the levers to provide a cross head or thrust bar. The ends of the shaft 16 project beyond the two bell cranks to mount rollers 17. These rollers ride on the tracks 13 to enable bodily movement of the lever structure 14 along the horizontal path defined by the tracks. While the rollers are actually mounted on the ends of the shaft 16, they are in effect carried by the bell crank levers.

One arm of each of the two bellcrank levers is connected by a link 18 to a fixed pivot 19 on the adjacent casting 11. The ends of the other arm of the bell crank levers are connected to the body by stiff links 20. Thus it will be seen that upon bodily movement of the lever structure 14 along the tracks, the bell cranks rock about the axis of the rollers and thereby raise and lower the body.

Motion is imparted to the lever structure 14 by hydraulic cylinders 21. In the present instance, two such cylinders are employed one on each side of the vertical median plane of the truck. For smaller capacities one adequately sized cylinder might be used and for larger loads three or more cylinders could be employed. One element of each of the two cylinders is anchored firmly to the cross beam 9 and the other element thereof, in this case the piston rod, is connected as at 22 to the tubular cross head 16' of the lever structure which, of course, is freely rotatable with respect to the shaft so that the shaft and the levers are free to rock while the tubular cross head does not.

Inasmuch as the cross beam 9 is rigidly welded or otherwise suitably secured to the longitudinal sills 7 and as the castings are likewise so secured to these same sills it follows that an exceptionally strong construction is provided. It will also be evident that although two cylinders are employed, one on each side of the vertical median plane of the truck, the fact that the two bell crank levers are rigidly tied together and can only move in unison insures against the application of unequal lifting forces on the opposite sides of the body even though the truck may be parked on a sidewise inclination throwing the center of gravity of the load to one side.

Attention is directed to the manner in which the operating mechanism nests into a relatively low space under the body to lower the center of gravity and obviate the need for a sub-frame. To this end the bell crank levers practically wrap around or rock over one of the cross members 8 of the chassis. In the lowered load transporting position, shown in Figure 2, the forward arms of the bell crank levers and the links 20 connecting them with the body protrude down into the chassis along side the cross member 8 and the other arms of the bell crank levers lie over the cross member. As the mechanism is operated to elevate the body the bell crank levers wrap around or rock over the cross member 8, as shown in dotted lines in Figure 3.

The body 5 is generally scoop-shaped having a closed front end 23 and closed sides 24 and an upwardly inclined bottom portion 25 at its rear end which is open. This formation allows the body to hold a substantial load and at the same time obviates the necessity for a tail gate.

The entire body is formed from structural shapes and plate and has a pair of transversely spaced longitudinal keels 26 extending continuously from the open rear end of the body along the underside thereof and up the closed front wall to project above the top plane of the body and arch forwardly over the cab 10 of the truck. These keels are built up of plate cut and welded to shape and have a U-shaped cross section with the marginal edges of their side flanges welded to the adjacent surfaces of the body shell as shown. For smaller capacities I beams may be substituted for the hollow construction described.

The upwardly and forwardly arched portions 27 of the keels support a hood 28 formed as a continuation of the front wall 23 and extend over the top of the cab to provide protection therefor, side walls 29 projecting up from the sides and front edges of this hood.

The keels 26 not only serve as a double backbone for the body but have downward projections 30 formed integrally therewith to mount bearings 31 in which the shaft 12' is received. Thus the connection between the body and the chassis is effected between the castings 11 mounted on the chassis sills and the keels 26 which form the main supports for the body.

It is, of course, obvious that the transverse spacing of the keels with relation to the spacing of the castings 11 is such that the keels lie just outside these castings.

Extending transversely of the body are ribs 32 which like the keels have a U-shaped cross section. All but one of these ribs extend continuously from the marginal edge of one side wall around the bottom of the body shell and up to the marginal edge of the opposite side wall. The rib 32' which does not extend continuously across the bottom of the body is interrupted at its medial portion to accommodate the hydraulic cylinders 21.

Figures 5, 6:
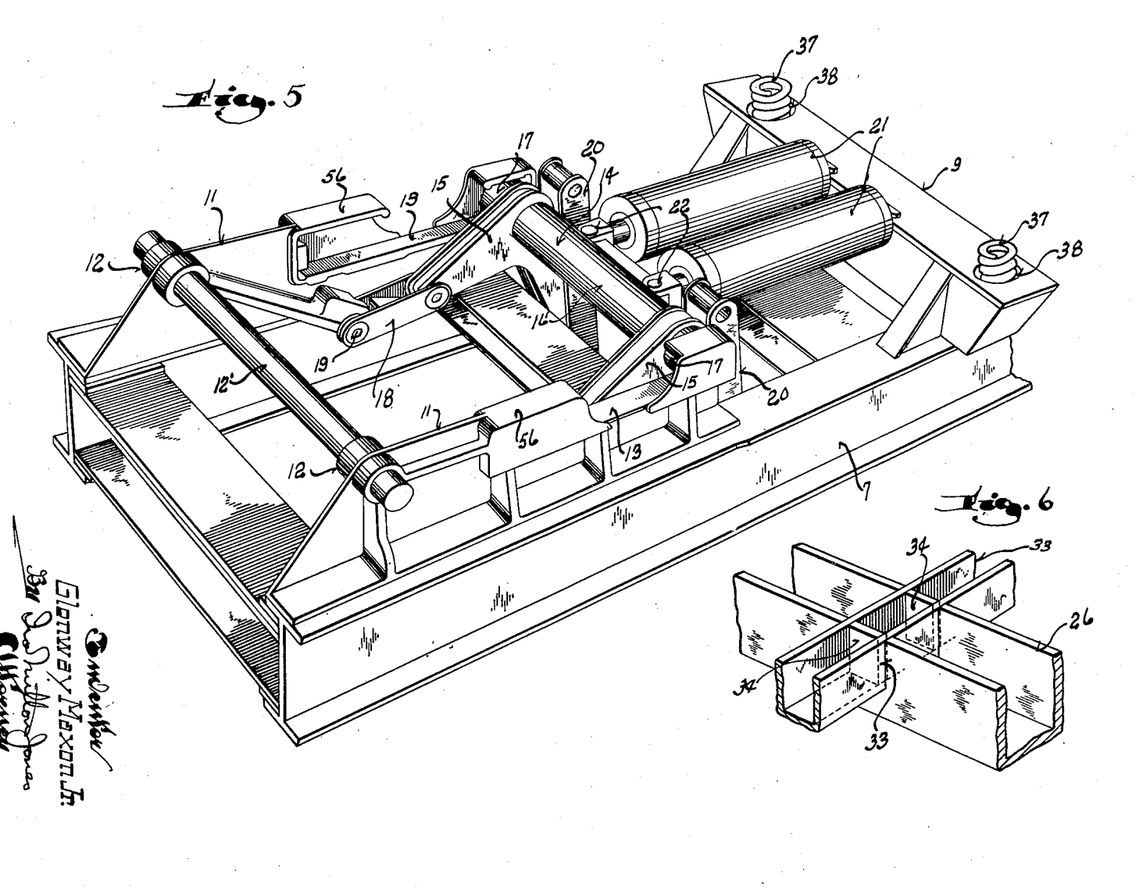
Figure 5 is a perspective view illustrating particularly the body operating mechanism, the body being entirely removed.
Figure 6 is a fragmentary perspective view illustrating a detail of the body construction.

As clearly shown the transverse ribs intersect and pass through the longitudinal keels and as specifically illustrated in Figure 6, the keels have their side flanges cut out as at 33 to accommodate the transverse ribs and permit them to continue directly through the keels. Inserts 34 welded into place between the side flanges of the ribs form in effect continuations of the flanges of the keels and thereby restore the keels to their original stiffness. These inserts may be the same pieces cut out from the keels to provide the openings 33.

Figure 4:
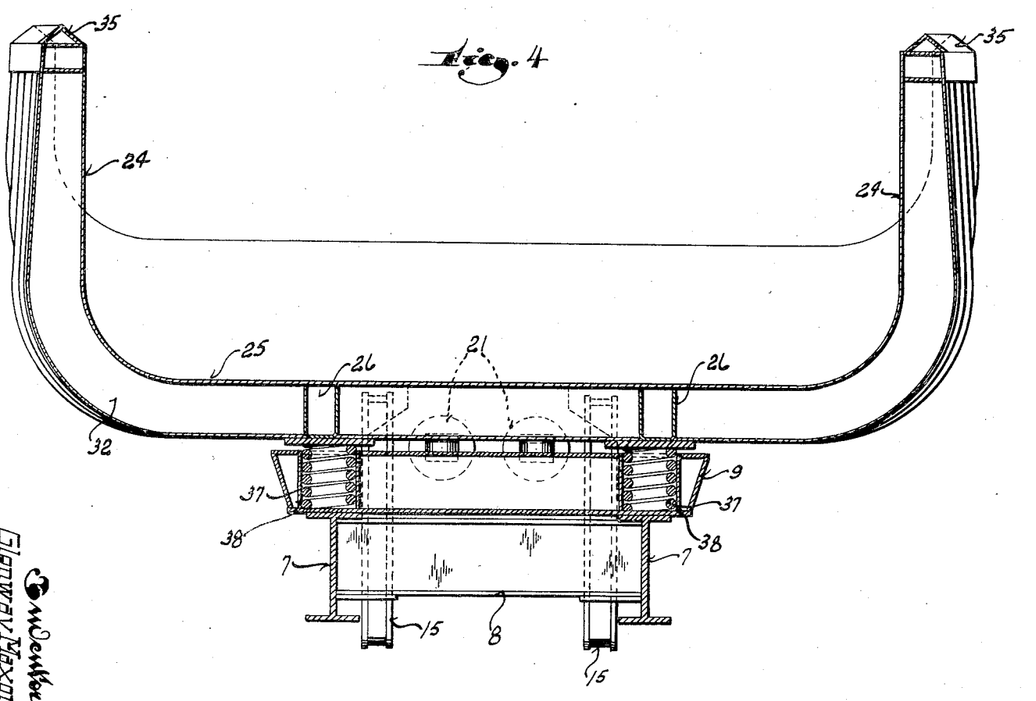
Figure 4 is a cross sectional view taken through Figure 2 on the plane of the line 4—4.

The marginal edges of the side walls are protected by rails 35, which as best shown in Figure 4 are of a width sufficient to encompass the upper ends of the ribs which are joined thereto; and the extreme rear open end of the body is protected by a tail plate 36 cut from heavy plate stock and welded into position.

When the body is in its lowered load carrying position, its front end rests on heavy coil springs 37 mounted in wells 38 in the hollow cross beam 9. These springs cushion the descent of the body to its lowered position and coact with the hydraulic system to hold the body in its lowered position in a manner which may be considered floating. The manner in which this is accomplished will be evident from a consideration of the hydraulic system shown in Figure 8 wherein there is diagrammatically illustrated in addition to the hydraulic cylinders 21, a pump 39 receiving fluid from a reservoir 40 through a filter 41.

Figure 8:
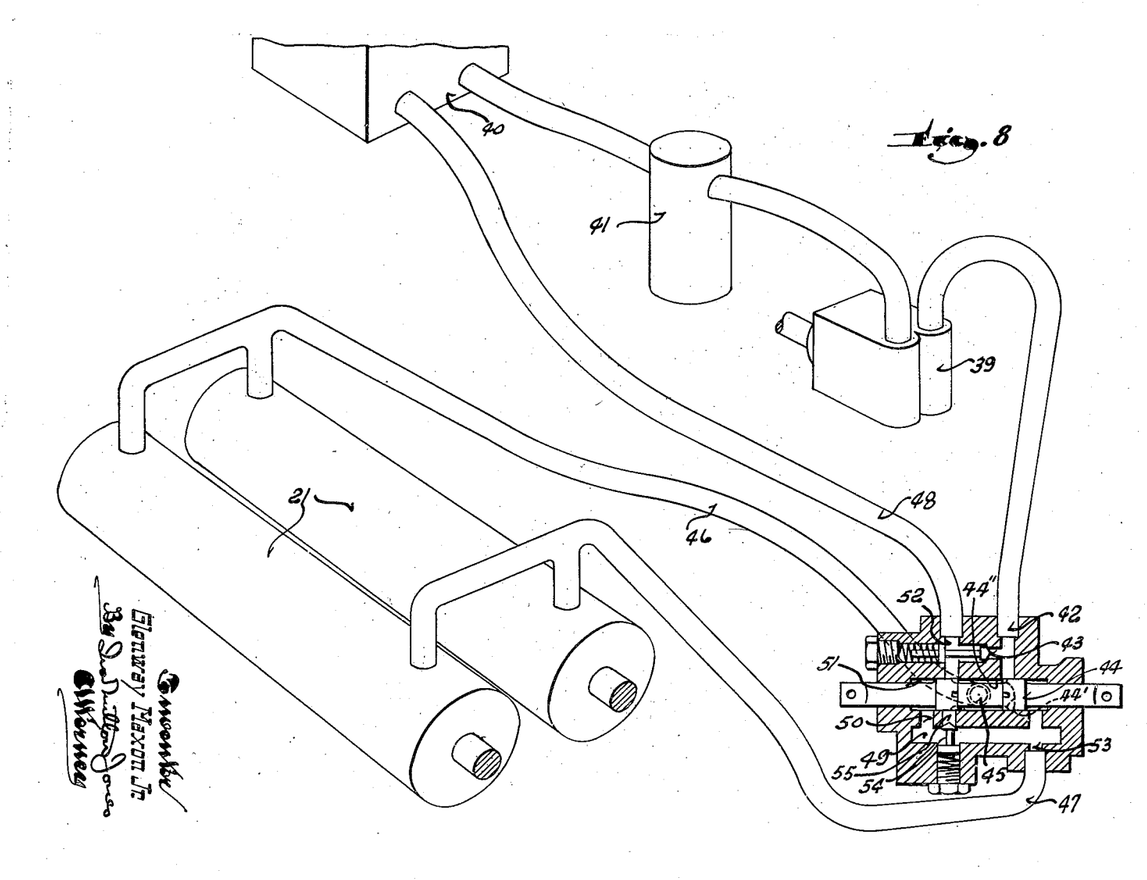
Figure 8 is a view diagrammatically illustrating the hydraulic system for raising and lowering the body.

The discharge of the pump leads to the inlet port 42 of the control valve 43 by which ascent and descent of the body is initiated and controlled.

The valve 43 has a spool type axially shiftable valve member 44 controlling the flow of fluid in the system. When this valve member is moved to the right from its neutral position shown in Figure 8, fluid under pressure flows from the inlet 42 to an outlet 45 which is connected by a duct 46 with forward ends of the hydraulic cylinders 21.

The rear ends of the cylinders 21 are at this time connected through a duct 47 with a return line 48 leading from the valve to the reservoir 40. The path of this return flow through the valve housing comprises a passage 49, a port 50 which connects the passage 49 with a bore 51 (in which the spool shaped valve member 44 operates), and an outlet port 52 which is uncovered when the spool shaped valve member 44 is moved to the right.

To lower the body, the valve member 44 is shifted to the left (in Figure 8) which establishes communication between the inlet port 42 and a port 53 with which the duct 47 connects. Fluid pressure is thus applied at the rear ends of the cylinders 21. At this time the forward ends of the cylinders 21 are connected to the return line 48 by virtue of the communication within the valve between the ports 45 and 52.

Obviously by controlling the position of the valve member 44 the rate of descent of the body to load carrying position is controlled. When the body descends to the point where it contacts the compression springs 37 and begins to compress the same pressure builds up in the cylinders 21 to the rear of the pistons to hold the body down against the tension of the springs 37.

With the return of the valve member 44 to its neutral position the fluid in the cylinders 21 and back of the pistons is locked under pressure to hold the body down against the tension of the springs 37. Thus pressure leakage in the system gradually allows the springs to push the body up, and as the truck travels over bumps the body inevitably tends to bounce. With descent of the body to compress the springs a check valve 54 controlling a port 55 opens to connect the opposite ends of the hydraulic cylinders with each other and thus admit more fluid into the cylinders back of the pistons.

Communication between the ports 53 and 45 is established for this purpose upon opening of the check valve 54 by reason of the fact that the opposite port closing ends of the spool type valve member 44 have notches 44', with the notches 44' at the left hand end of the valve member opening into the longitudinal passage 44" inside the valve at the exterior of the turned down medial portion of the valve member and into the port 55 controlled by the check valve 54 when the valve member is in its neutral position shown.

In this manner the tendency of the front end of the body to bounce is effectively snubbed and a substantially floating support provided for the body.

Figure 1:
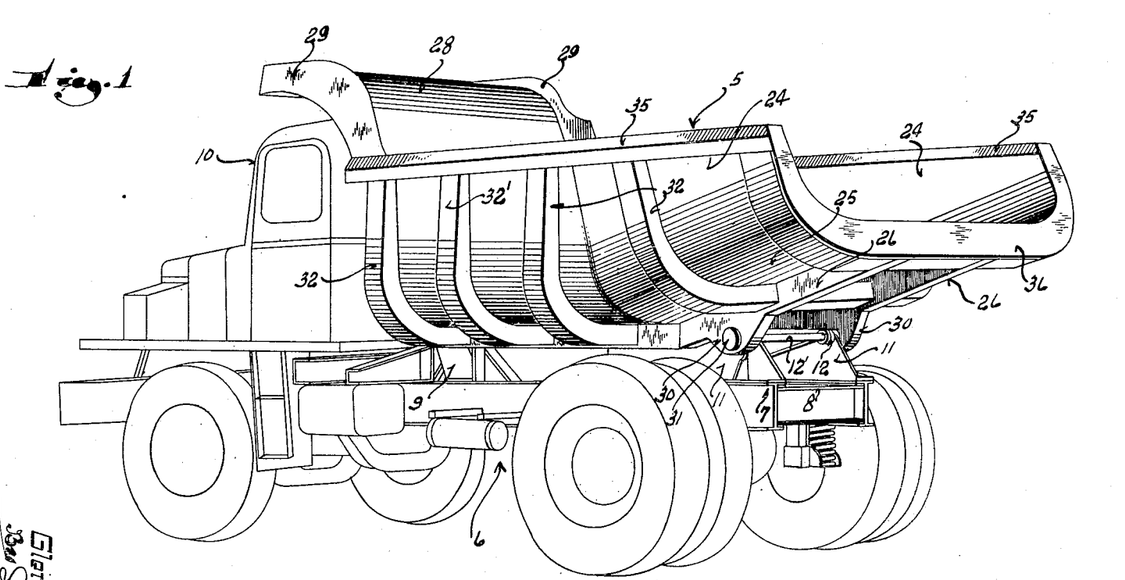
Figure 1 is a perspective view of a dump truck embodying this invention.
Figures 1, 3:
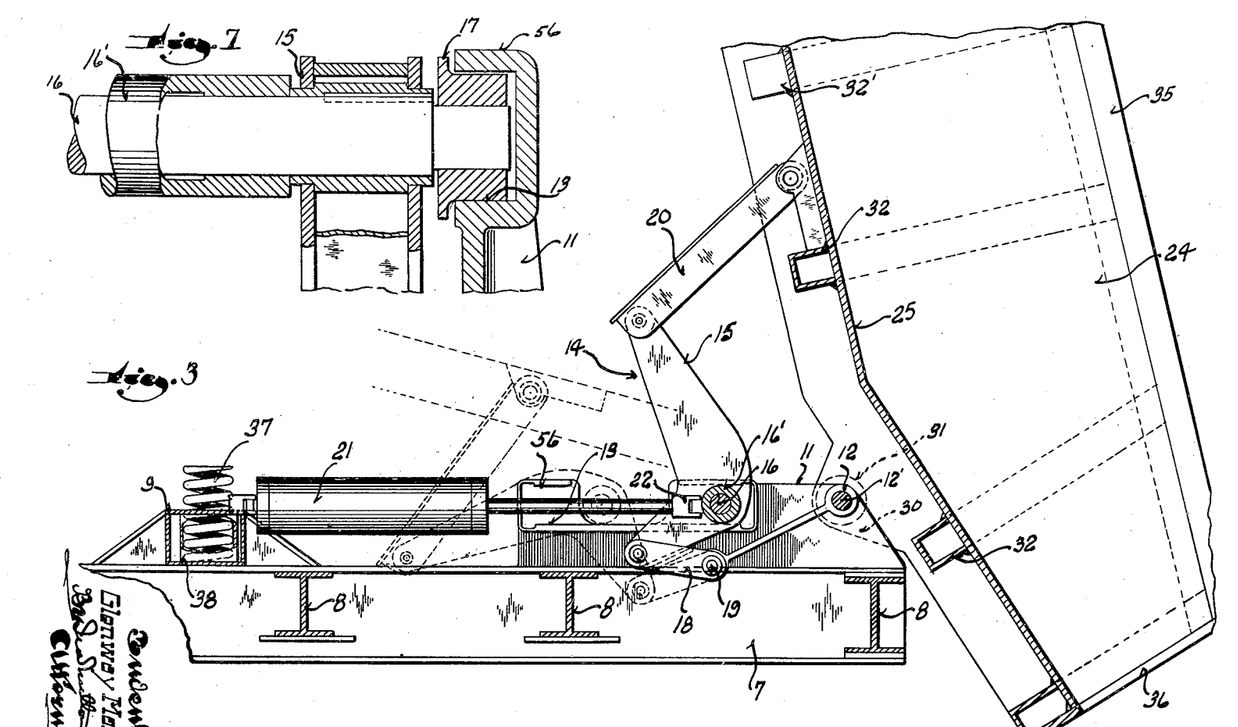
Figure 3 is a view similar to Figure 2 but illustrating the body in its elevated load discharging position.
Figure 2:
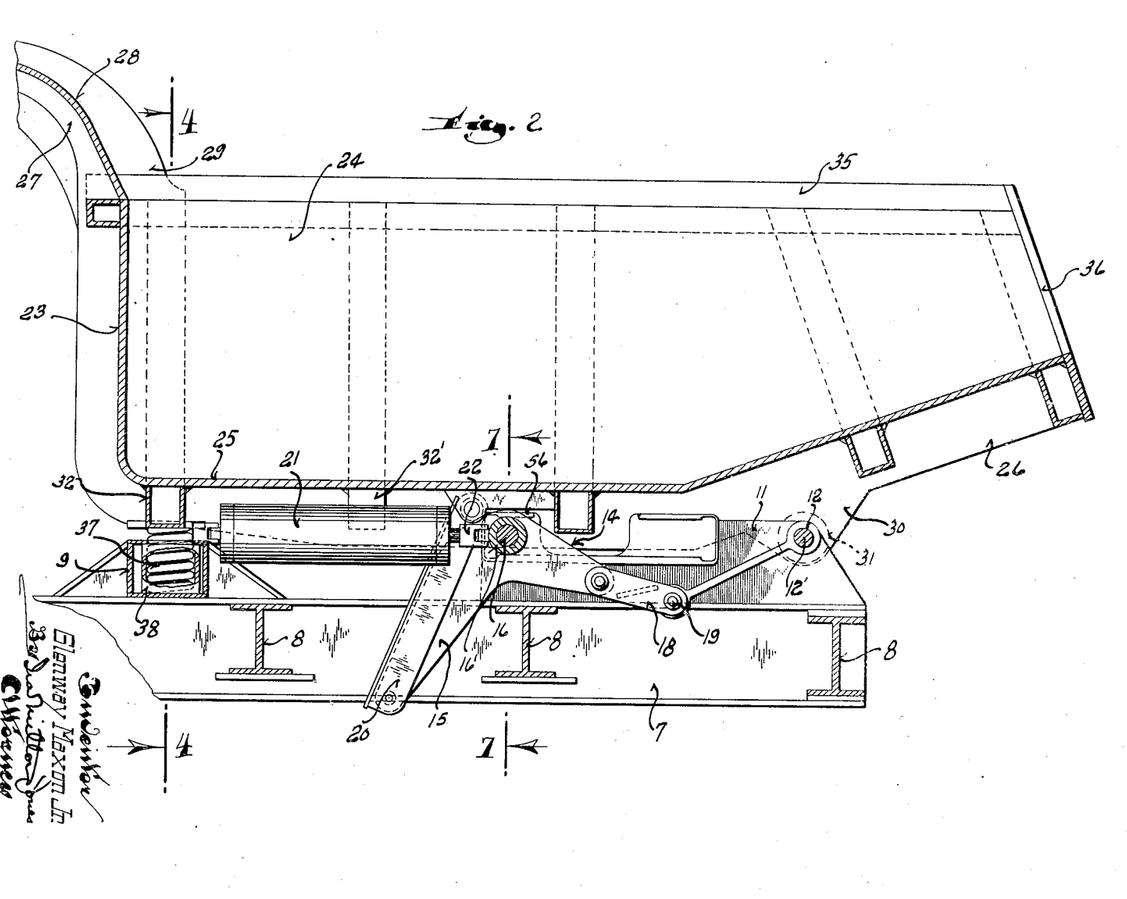
Figure 2 is a longitudinal sectional view through the body and its mounting.

The distribution of the weight of the body and the relative dimensions and arrangement of the levers and linkage comprising the tilting mechanism is such that when the body is in its elevated load discharging position shown in Figure 3, the pull applied on the lever structure by the hydraulic cylinders lifts the rollers off the tracks. This condition is also sometimes experienced during elevation of the body, for with some types of material the load slides out of the body more or less as a solid mass and as it rides over the inclined tail portion it has a tendency to whip the body and lift the rollers off their tracks.

To limit this lifting of the rollers off the tracks, the castings 11 are equipped with guard rails or auxiliary track means 56 overlying the tracks and the rollers thereon. The medial portion of these guard rails are interrupted as shown to accommodate the adjacent rib 32 when the body is lowered, and also to facilitate assembly of the lever structure 14 with the tracks. These interruptions in effect serve as gateways to allow the lever structure to be set down onto the tracks.

During the initial lowering of the body and until a position is reached at which gravity acting on the body holds the rollers down, the rollers ride on the guard rails or auxiliary track means.

From the foregoing description taken in connection with the accompanying drawings, it will be readily apparent to those skilled in the art, that this invention provides a dump truck which has many advantages over dump trucks heretofore in use and that it is particularly well adapted for extremely heavy duty.

What I claim as my invention is:

1. In a dump truck, the combination of: a supporting structure; a body having a discharge opening at the rear end thereof; means tiltably mounting the body on the supporting structure for elevation of its front end into a load discharging position; a hydraulic system for raising and lowering the front end of the body including a hydraulic cylinder the movable element of which is operatively connected with the body, a source of fluid under pressure, and valve means for controlling the flow of fluid under pressure to the cylinder to enable the movable element of the cylinder to be moved in one direction or the other to effect raising and lowering of the body, said valve means being operable to hold the fluid under pressure in the hydraulic cylinder in a manner to restrain the body against upward movement out of lowered load transporting position, but pressure leakage in the hydraulic system tending to allow the body to be thrown upwardly by travel of the truck on rough roads to produce motion of said movable element of the cylinder in one direction; and other valve means incorporated in said hydraulic system and responsive to motion of the movable element of the cylinder in said direction for admitting additional fluid under pressure into the cylinder to cause the body to return to its lowermost load transporting position and to minimize bouncing of the body during transit.

2. In a dump truck having a supporting structure and a body tiltably mounted on the supporting structure and adapted to be tilted to and from a load discharging position, means for tilting the body comprising: a pair of transversely spaced rigidly connected levers; horizontal tracks on the supporting structure; coaxially disposed rollers mounted on the levers medially of their ends and riding on said horizontal tracks whereby said rigidly connected levers are unitarily bodily movable along said tracks and also rockable in unison about the axis of the rollers; a link connecting one end of each lever with the body; links connecting the other end of each lever with the supporting structure so that bodily movement of said connected levers along said horizontal tracks causes the levers to rock about the axis of the rollers as they move along said tracks to raise or lower the body; means for effecting such motion of the connected levers; and means for holding the rollers on the track when said rollers are in the position they occupy when the body is in a tilted discharging position.

3. In a dump truck having a supporting structure and a body tiltably mounted thereon, means for tilting the body comprising: transversely spaced horizontal tracks on the supporting structure; a rigid bell crank lever unit between said tracks; coaxial rollers on said bell crank lever unit riding on said tracks; a pivot fixed with respect to the supporting structure; means linking one arm of the bell crank lever unit to said pivot; means linking the other arm of the bell crank lever unit to the body, so that bodily movement of the bell crank lever unit along the tracks effects rocking of the lever unit about the axis of the rollers to tilt the body; and single means for moving the bell crank lever unit along the tracks in one direction to raise the body and in the opposite direction to lower the body.

4. In a dump truck having a supporting structure and a body tiltably mounted thereon, means for tilting the body comprising: transversely spaced horizontal tracks on the supporting structure; a rigid bell crank lever unit between the tracks; coaxial rollers on said bell crank lever unit riding on the tracks; a pivot fixed with respect to the supporting structure; means linking one arm of the bell crank lever unit to said fixed pivot; means linking the other arm of the bell crank lever unit to the body so that bodily movement of the bell crank lever unit along the tracks effects rocking of the lever unit about the axis of the rollers to tilt the body; single means for moving the bell crank lever unit along the tracks in one direction to raise the body and in the opposite direction to lower the body; the distribution of the weight of the body and the arrangement and relative dimensions of the means linking the lever to the fixed pivot and the body being such that the application of force on the lever unit to lower the body from a fully elevated dumping position lifts the rollers off the tracks; and auxiliary track means overlying the tracks to limit movement of the rollers off the tracks and on which the rollers ride until the body reaches a position at which gravity holds the rollers down on the tracks.

5. In a dump truck of the character described: a frame having longitudinal sills; track forming means mounted on the sills, each having a part forming a horizontal track; a dump body; means tiltably supporting the body on said sills; means for tilting the body including a pair of rigidly connected bell crank levers; coaxial rollers carried by the levers medially of their ends, said rollers running on the tracks; linkage connecting one arm of each bell crank lever with the body; linkage connecting the other arm of each bell crank lever with the track forming means so that movement of the connected bell crank levers along the tracks rocks the levers about the axis of the rollers to raise and lower the body; means for so moving the connected levers; and guards on the track forming means overlying the end portions of the tracks and the rollers thereon to limit movement of the rollers off the tracks.

6. In a dump truck the combination of: a supporting frame; a body; a hinge connection between the frame and body; transversely spaced horizontal tracks on the supporting frame forwardly of said hinge connection; a bell crank lever; coaxial rollers on said lever riding on the tracks to guide the lever for bodily motion towards and from said hinge connection; a pivot fixed with respect to the supporting frame and disposed forwardly of said hinge connection and beneath said tracks; a link connecting one arm of the bell crank lever with said fixed pivot; a link connecting the other arm of the bell crank lever with the body so that bodily movement of the lever along the tracks towards said hinge connection rocks the lever to raise the body while opposite bodily motion of the lever rocks the lever to lower the body, the relative dimensions of the links and the bell crank lever arms to which they are connected and the relative spacing of their points of connection being such that the application of force on the bell crank lever to move the same away from said hinge connection when the body is in its fully raised position has an upward component causing the rollers to be lifted off the tracks; auxiliary track means overlying the tracks and the rollers thereon for limiting movement of the rollers off the tracks and guiding the bodily motion of the bell crank lever until the body assumes a position at which gravity holds the rollers on the tracks; and means for moving the bell crank lever towards and from said hinge connection.

7. In a dump truck the combination of: a supporting frame; a body; a hinge connection between the frame and body; transversely spaced horizontal tracks on the supporting frame forwardly of said hinge connection; a bell crank lever; coaxial rollers on said lever riding on the tracks to guide the lever for bodily motion towards and from said hinge connection; a pivot fixed with respect to the supporting frame and disposed forwardly of said hinge connection and beneath said tracks; a link connecting one arm of the bell crank lever with said fixed pivot; a link connecting the other arm of the bell crank lever with the body so that bodily movement of the lever along the tracks towards said hinge connection rocks the lever to raise the body while opposite bodily motion of the lever rocks the lever to lower the body, the relative dimensions of the links and the bell crank lever arms to which they are connected and the relative spacing of their points of connection being such that the application of force on the bell crank lever to move the same away from said hinge connection when the body is in its fully raised position has an upward component causing the rollers to be lifted off the tracks; auxiliary track means overlying the tracks and the rollers thereon for limiting movement of the rollers off the tracks and guiding the bodily motion of the bell crank lever until the body assumes a position at which gravity holds the rollers on the tracks; and a hydraulic cylinder having one of its elements anchored to the supporting frame and its other element connected with the bell crank lever for positively moving the bell crank lever towards and from said hinge connection to respectively raise and lower the body.

8. In a dump truck of the character described: a frame having longitudinal sills; track forming members fixedly mounted on said sills at one end thereof, each having a part forming a fixed substantially horizontal track; a dump body; means tiltably mounting the body on said track forming members for tilting movement about an axis to the rear of said tracks; means for tilting the body including a pair of rigidly connected bell crank levers carrying coaxial rollers at the juncture of their arms, said rollers running on the tracks; linkage connecting one arm of each bell crank lever with the body; linkage connecting the other arm of each bell crank lever with the track forming members said linkages enabling the connected bell crank levers to be moved bodily along said tracks to effect raising and lowering of the body; a cross member mounted on the longitudinal sills and rigidly secured thereto forwardly of said track forming members; and hydraulic means anchored to said cross member and connected with said bell crank levers for moving the same along the horizontal tracks.

9. In a dump truck having a supporting frame and a body tiltably mounted on the frame, means for tilting the body comprising: transversely spaced horizontal tracks on the frame; a pair of transversely spaced bell crank levers, one on each side of the vertical median plane of the truck; coaxial rollers carried by the bell crank levers and riding on the tracks; a link connecting one arm of each bell crank lever with a pivot fixed with respect to the supporting frame and located forwardly of the tiltable mounting for the body; a link connecting the other arm of each bell crank lever with the body forwardly of said tiltable mounting, so that bodily movement of the bell crank levers rearwardly along said tracks results in rocking motion of the bell crank levers about the axis of the rollers in the direction to raise the body and vice versa; a plurality of hydraulic cylinders for moving the bell crank levers along the tracks; a member fixed with respect to the supporting frame and to which one element of each hydraulic cylinder is secured; a transverse member connected with said bell crank levers and to which the other elements of the hydraulic cylinders are connected; the connections between the transverse member and said elements of the hydraulic cylinders and the cylinders being spaced transversely of the truck so that the loads on the cylinders vary with sidewise inclination of the truck; and means rigidly connecting the bell crank levers with each other so that both levers must rock in unison to insure both sides of the body being elevated at the same rate regardless of possible sidewise inclination of the truck.

10. In a dump truck having a supporting frame and a body tiltably mounted on the frame, means for tilting the body comprising: transversely spaced horizontal tracks rigidly fixed to the frame; a rigid lever unit composed of two transversely spaced bell cranks and a cross shaft to which the bell cranks are non-rotatably fixed; coaxial rollers carried by the bell cranks and riding on said tracks; means for effecting translatory movement of said cross shaft to bodily move the bell cranks along said tracks and for simultaneously rotating said rigid lever unit; and links for imparting the movement of the extremities of the bell cranks to said tiltably mounted body; the rigid tie between the bell cranks insuring their movement in unison regardless of exterior unsymmetric forces.

11. In a dump truck having a supporting structure and a body tiltably mounted on the supporting structure and adapted to be tilted to and from a load discharging position, means for tilting the body comprising: transversely spaced horizontal tracks on the supporting structure; a pair of transversely spaced rigidly connected levers between said tracks; anti-friction means riding on each of said tracks; coaxial connections between said anti-friction means and said levers, whereby said levers are unitarily bodily movable along said tracks, said connections allowing the levers to rock in unison about the axis of said connections; a link connecting the same end of each lever with the body; a link connecting the other end of each lever with the supporting structure so that bodily movement of said connected levers along said horizontal tracks causes the levers to rock about said axis to raise or lower the body; and means for effecting such motion of the connected levers.

GLENWAY MAXON, JR.

REFERENCES CITED

The following references are of record in the file of this patent:

UNITED STATES PATENTS

| Number | Name | Date |
| --- | --- | --- |
| 1,715,491 | Barrett | June 4, 1929 |
| 1,904,922 | Jungersen | Apr. 18, 1933 |
| 1,957,497 | Galanot | May 8, 1934 |
| 2,136,231 | Biszantz | Nov. 8, 1938 |
| 2,140,590 | Meininger | Dec. 20, 1938 |
| 2,192,128 | Ehrick et al. | Feb. 27, 1940 |